United States Patent [19]
Petersen

[11] 3,973,937
[45] Aug. 10, 1976

[54] ENGINE AIR PRECLEANER

[76] Inventor: Ross K. Petersen, 2974 W. River Road, Minneapolis, Minn. 55406

[22] Filed: Aug. 7, 1975

[21] Appl. No.: 602,667

Related U.S. Application Data

[63] Continuation-in-part of Ser. No. 571,584, April 25, 1975.

[52] U.S. Cl. ............................. 55/449; 55/452; 55/404; 55/457; 55/470
[51] Int. Cl.$^2$ ........................................ B01D 45/12
[58] Field of Search .................. 55/385 B, 391, 393, 55/394, 396, 404, 405, 408, 409, 424, 430, 449, 456, 457, 342, DIG. 28, 451, 454, 452, 466, 470; 180/54 A, 69.01

[56] References Cited
UNITED STATES PATENTS

| | | | |
|---|---|---|---|
| 1,434,562 | 11/1922 | Quam | 55/391 X |
| 1,438,553 | 12/1922 | Quam | 55/391 |
| 1,530,825 | 3/1925 | Grimes | 55/DIG. 28 |
| 1,641,746 | 9/1927 | Donaldson | 55/457 X |
| 2,448,048 | 8/1948 | Porter | 55/404 |
| 2,910,314 | 10/1959 | Klein | 285/177 |
| 2,952,327 | 9/1960 | Farr | 55/385 B |
| 3,207,250 | 9/1965 | Bamford | 55/DIG. 28 |
| 3,357,163 | 12/1967 | Burger et al. | 55/385 B |
| 3,670,480 | 6/1972 | Peterson | 55/394 |
| 3,740,932 | 6/1973 | Borsheim | 55/394 |

FOREIGN PATENTS OR APPLICATIONS 284,599 4/1931 Italy ........................ 55/396 X Primary Examiner—Frank W. Lutter
Assistant Examiner—David L. Lacey
Attorney, Agent, or Firm—Burd, Braddock & Bartz

[57] ABSTRACT

An intake air system for an internal combustion engine having an upright stack mounted on vehicle structure, as a hood, with a stack connecting assembly. An air precleaner is mounted on the upper end of the stack. The lower end of the stack is connected to tubular members which leads to the air cleaner of the engine. The precleaner has a cylindrical housing surrounding a separation chamber. A vane assembly has a plurality of circumferentially spaced vanes providing an inlet passage open to the chamber for directing the air and particles into the chamber in a circular motion. A sleeve is centrally attached to the vane assembly and has a central outlet passage for carrying cleaned air from the chamber. An impeller assembly is rotatably mounted in the chamber and has a plurality of rotors having paddles located in contiguous relationship with respect to the walls of the chamber and a discharge opening in the housing. The impeller assembly can also have a propeller means located in the central outlet passage and rotatable in response to the passage of air through the central outlet passage. Rotation of the propeller helps sustain rotation of the rotor assembly wherein the paddles drive air carrying the entrained particles through the discharge opening.

21 Claims, 5 Drawing Figures

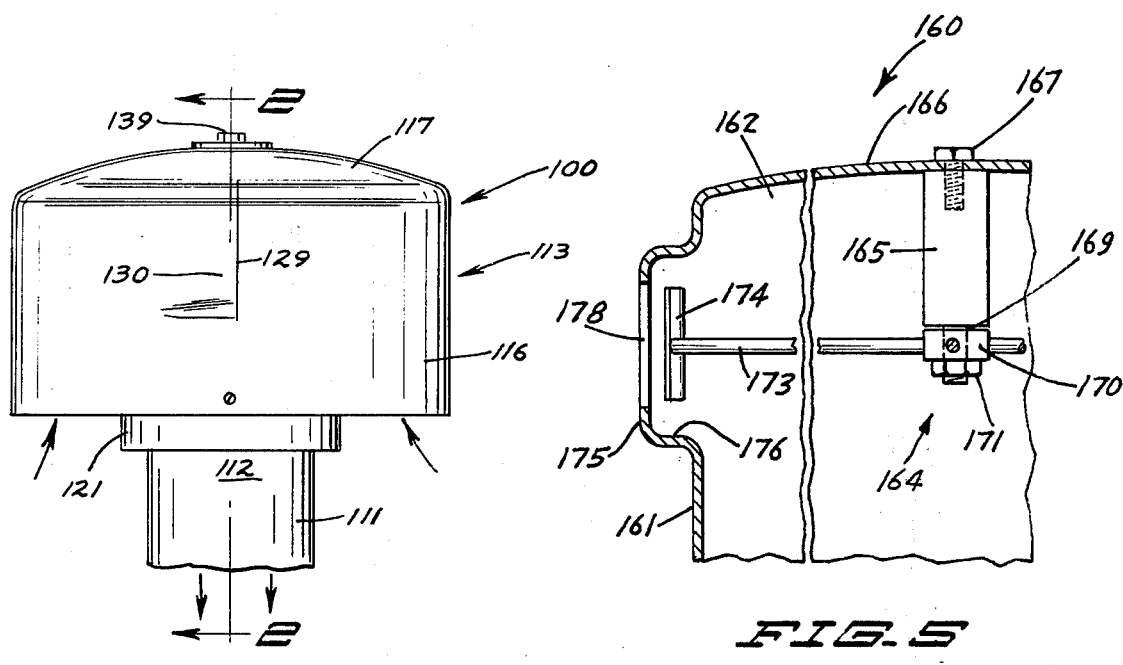
FIG. 1
FIG. 5
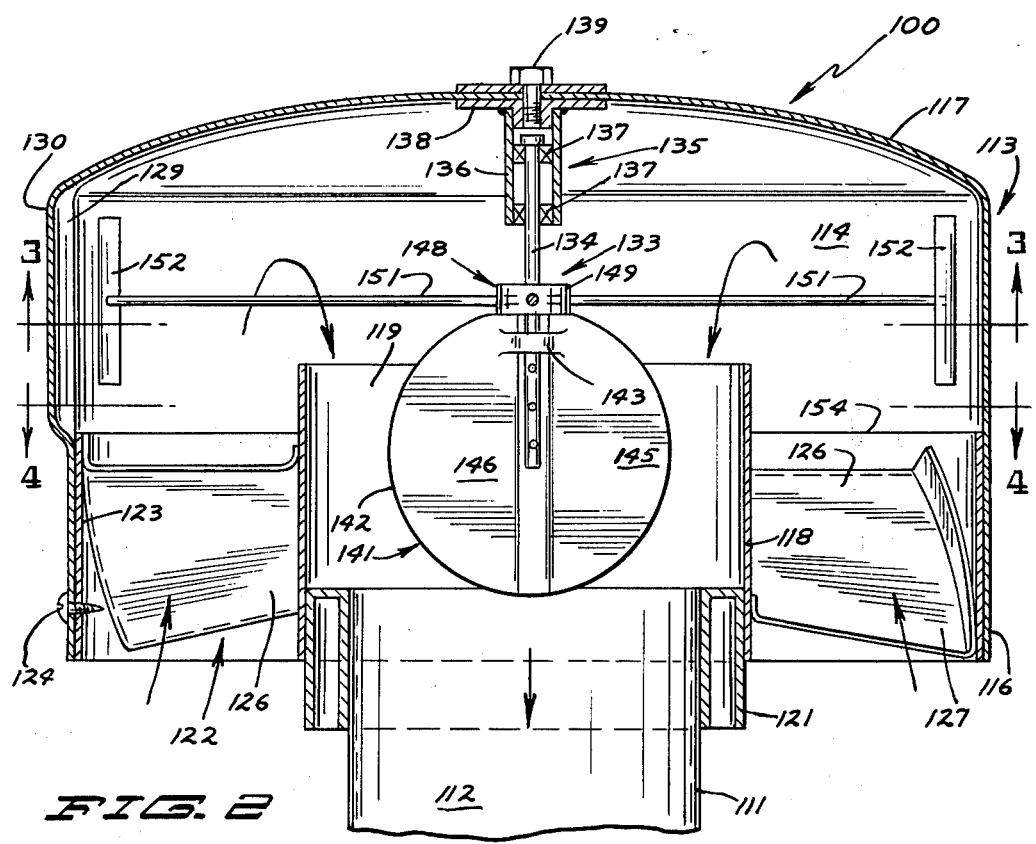
FIG. 2

ENGINE AIR PRECLEANER

CROSS REFERENCE TO RELATED APPLICATION

This application is a continuation-in-part of U.S. application Ser. No. 571,584 filed Apr. 25, 1975.

BACKGROUND OF THE INVENTION

Prior to the introduction of air into an internal combustion engine, it is desirable to remove from the air, so far as possible, entrained particulate matter such as dirt, dust, sand, snow and the like. Air cleaners and precleaners in general use for such purpose promote more efficient combustion and longer engine life.

Air cleaners are normally mounted on or adjacent the carburetors of internal combustion engines. This locates the air cleaners under the hoods or cover structures for the engine. Air intake pipes or stacks are used to carry outside air to the air cleaners. Air precleaners located outside of the hoods are mounted on the stacks to provide for the flow of relatively clean air into the stacks. The air cleaners function to further clean the air before it flows into the engine. Air precleaners which have been devised utilize centrifugal force of air circulating within a chamber to separate clean air from air entrained with particulate matter for introduction of the clean air into the carburetor inlet. For example, see U.S. Pat. No. 3,670,480. Stationary deflection blades disposed in an inlet to the chamber impart circular motion to the air flowing through the chamber to centrifugally separate air entrained with particulate matter from clean air. An impeller assembly is used to push the air entrained with particulate matter out of a discharge from the chamber. Such devices, however, do not take full advantage of air movement produced at the carburetor inlet to power the impeller.

SUMMARY OF THE INVENTION

The invention relates to an air intake system for use with an apparatus or machine that requires a supply of relatively clean air. More particularly, the invention is directed to an air precleaner for an air intake system for an internal combustion engine. The system has an air intake pipe or stack mounted on vehicle structure with a connecting assembly. The inside end of the stack projects through the vehicle structure and is connected to tubular means leading to and connected to the air cleaner of the engine. The air precleaner mounted on the outside end of the stack functions to separate particulate matter as dirt, dust, sand, snow and the like from air moving through the precleaners.

The precleaner includes a housing having a separation chamber. A vane assembly provides for the introduction of air into the separation chamber in a circuitous path. An outlet passage open to the chamber communicates with the inlet stack of the internal combustion engine. A discharge opening is spaced from the outlet passage and is located on a side wall of the chamber providing a passageway for gas having entrained particulate matter. Movably mounted within the chamber is a rotatable member or impeller. The impeller member includes a plurality of rotor members having paddles located in a contiguous relationship with respect to the discharge opening to force particle entrained air out of the discharge opening. The impeller can also include a propeller located in the outlet passage and rotatable in response to movement of air through the outlet passage.

An object of the invention is to provide an air precleaner apparatus for the separation of entrained particulate matter from air or gas being delivered to an internal combustion engine. A second object of the invention is to provide such an apparatus having a self-driven impeller means to promote separation of entrained particulate matter from the air. Further objects of the invention will become apparent upon the following description.

IN THE DRAWINGS

FIG. 1 is a side elevational view of an air precleaner of the invention usable with an air cleaning system;

FIG. 2 is an enlarged sectional view taken along line 2—2 of FIG. 1;

FIG. 5 is a foreshortened sectional view of a second embodiment of an air precleaner according to the invention.

DESCRIPTION OF PREFERRED EMBODIMENTS

Figure 3:
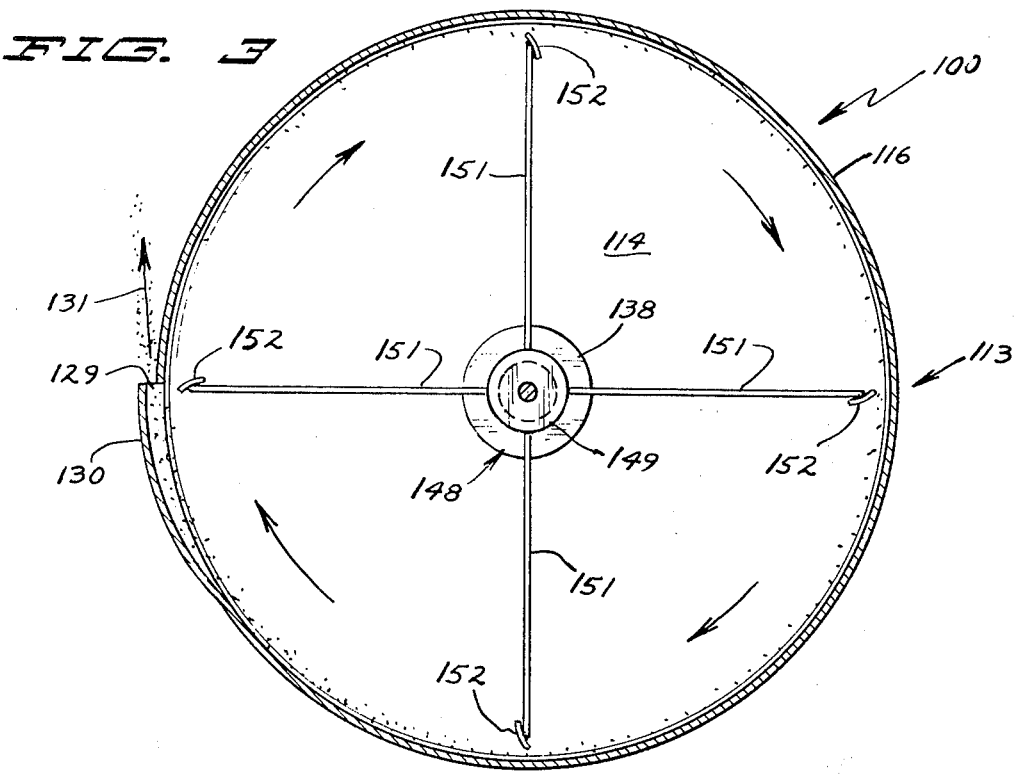
FIG. 3 is a sectional view taken along line 3—3 of FIG. 2.
Figure 4:
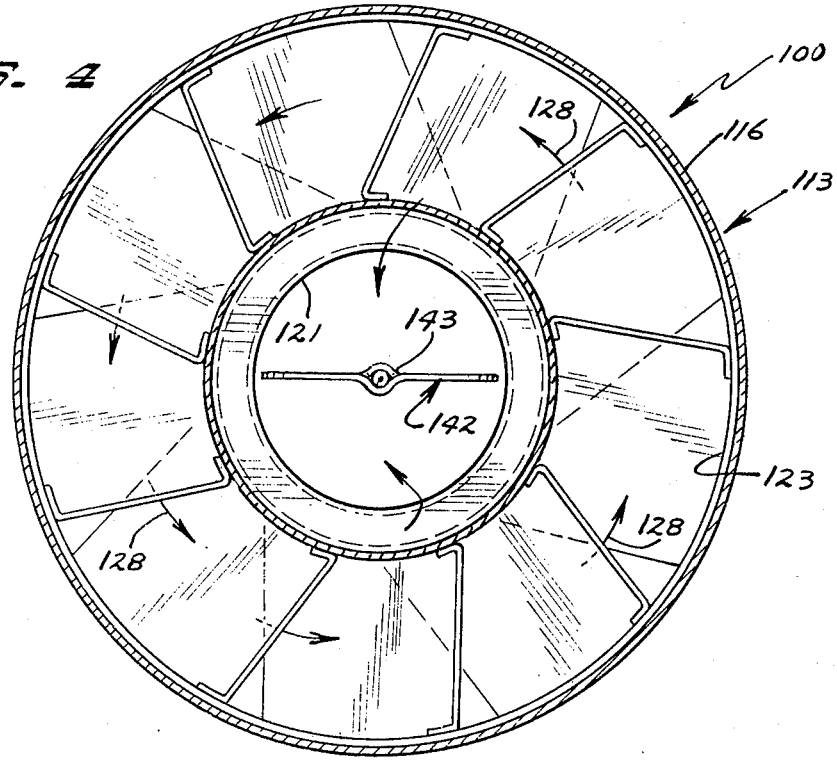
FIG. 4 is a sectional view taken along line 4—4 of FIG. 2.

Referring to FIGS. 1–4, a precleaner 100 according to the present invention is mounted on a low pressure air intake stack or pipe 111. Intake stack 111 has a passage 112 for directing air, gas or like fluids to a selected location. Precleaner 100 is suitable for removal of particulate matter from gas and those environments having a requirement for cleaned gas, however, precleaner has particular use in connection with the air cleaner of an internal combustion engine, as a gasoline or diesel engine.

Such as internal combustion engine may be of the type used on farm tractors, over-the-road trucks, earthmoving equipment, industrial engines, and the like. Cleaner 100 serves as a precleaner for separating the air borne particles, as dust, fibers, dirt, sand, and the like, from the air prior to the passage of the air to the air cleaner of the internal combustion engine and thence to the carburetor. The air cleaner operates more efficiently and is prevented from clogging thus extending the life span thereof and promoting clean and efficient combustion in the internal combustion engine.

Cleaner 100 has a tubular or cylindrical housing, indicated generally at 113, defining a separation chamber 114. The housing 113 has an upright cylindrical side wall 116 attached to a domed top wall 117. Both the side wall 116 and the top wall 117 can be integrally fabricated of plastic or metal. Located concentrically within the chamber 114 is a sleeve 118 having a central outlet passage 119 forming the mouth of passage 112. The top of sleeve 118 is open to the approximate mid portion of chamber 114. Snugly located within the sleeve 118 at the lower portion thereof is an adapter collar 121 having an internal diameter of a sufficient dimension to snugly fit over the exterior diameter of a pipe or stack 111. Adapter collar 121 serves as a spacer and is interchangeable with adapter collars of varying internal diameters for use on different sizes of intake stacks. Thus, cleaner 100 is usable on various sizes and makes of internal combustion engines having differing sizes of intake stacks simply by interchanging the adapter collars.

Housing 113 includes a vane assembly 122 located at the lower portion of housing 113 to provide air or gas inlet to chamber 114. Vane assembly 122 has a cylindrical frame 123 coextensive with and snugly fitted to the lower internal portion of side wall 116 of housing 113 and fastened thereto by suitable means as screws 124. Sleeve 118 is secured to the frame 123 with a plurality of radially outwardly directed vanes 126 of vane assembly 122. The adjacent vanes 126 are stationary and spaced from each other to provide inlet openings 127 around the sleeve 118 open to the outer area of separation chamber 114. The vanes 126 are sloped or inclined upwardly in a circumferential direction to direct inlet air, indicated by the arrows 128 in FIG. 4, in an upward and circumferential or spiral direction into the cylindrical separation chamber 114. The circular movement of air in the chamber 114 establishes centrifugal forces on the particles entrained in the air to carry the particles outwardly against the side wall 116. Air is moved through the inlet openings 127 in response to the low pressure created in outlet 112 of stack 111 as air is drawn therethrough by the internal combustion engine operation. The centrifugal force experienced by the air entering the chamber 114 causes air having entrained particles to move toward the side walls 116 leaving clean air centrally located in the chamber 114.

As shown in FIGS. 1 through 3, side wall 116 of housing 113 has a vertical discharge opening 129 for the discharge of air carrying entrained particulate matter and forced toward side wall 116 by centrifugal forces. Discharge opening 129 is formed by an outwardly extended portion or bump 130 of side wall 116 and is tangentially directed relative to side wall 116 in the direction of air movement in chamber 114. Discharge opening 129 spans the vertical expanse of side wall 116 approximately equal to that portion of chamber 114 above the vane assembly 122. Discharge opening 129 provides for the discharge of air having entrained particulate matter, indicated by the arrow 131 in FIG. 3, which is centrifugally forced outward in chamber 114 toward the side wall 116. The remaining clean air centrally located in chamber 114 passes through the mouth 119 provided by sleeve 118 and thence through passage 112 of intake stack 111 to the internal combustion engine.

A rotatable impeller or spinner assembly 133 is located in chamber 114. Spinner assembly 133 is mounted on a vertical shaft 134 rotatably assembled to bearing assembly 135. Bear-assembly 135 has a casing 136 housing a pair of vertically aligned bearings 137 which engage the upper end of shaft 134. A flange 138 on casing 136 is assembled to the central top portion of domed top 117 by a bolt 139.

Spinner assembly 133 can include a propeller means 141 located in the outlet passage 119 of sleeve 118 and thus in direct communication with inlet passage 112 of intake stack 111 to take maximum advantage of the air flow produced by the low pressure at intake stack 111 to assist in rotating spinner assembly 133. Propeller means 141 is constituted as a flat disc 142 assembled along a diameter thereof to the lower end of shaft 134 of spinner assembly 133 as by engagement of the lower end of shaft 134 with an outwardly notched section 143 of disc 142. The opposing halves of disc 142 on opposite sides of the end of shaft 134 comprise blades 145, 146 rotatable in response to the air flow through the outlet passage 119. Air in circulating motion in chamber 114 entering passage 119 establishes a vortex-like flow or circulation within sleeve 118, impinging upon the blades 145, 146 of disc 142 to cause rotation thereof and of spinner assembly 133.

Spinner assembly 133 includes a rotor assembly 148 to induce discharge of particle entrained air from the chamber 114 through discharge opening 129. A collar 149 is fixably secured to shaft 134 above disc 142 and in general horizontal alignment with the proximate mid-portion of discharge opening 129. A plurality of preferably four arms 151 are equally spaced about the collar 149 and extend radially outward therefrom, having ends contiguous with the inner face of side wall 116 of housing 113. Secured to the outer end of each arm 151 is a paddle 152 constituted as an elongate blade vertically orientated and forwardly curved in the direction of rotation of rotor assembly 148. Each blade has a length slightly less than the length of discharge outlet 129 to promote smooth air flow and reduce flow interference with the chamber walls. Upon rotation of rotor assembly 148, the paddles 151 sweep along immediately against the inside wall of chamber 114, passing in close proximity to the discharge opening 129, to urge the particulate entrained air along the outer extremities of chamber 114 and outward of discharge opening 129. The forward curve of each blade pushes air through the discharge opening and also creates air flow behind the paddle which follows through the discharge opening. Rotor assembly 148 rotates in response to rotational movement imparted to the disc 142 upon the flow of air through outlet passage 119. The number of arms 151 and paddles 152 can vary according to the size of the cleaner and the speed of rotation of the disc 142. Preferably, the total number and pumping surface of the paddles 152 is proportioned to move a sufficient volume of air out of the separation chamber 114 to eliminate entrained particles and prevent their entry into stack 111.

As shown in FIG. 2, cleaner 100 is optionally provided with an inner peripheral ledge or lip 154 located in the lower portion of chamber 114. Lip 154 extends from the top of frame 123 of vane assembly 122 inwardly toward chamber 114 a short distance. Lip 154 is effective to block interference between air flow coming through the vane assembly 122 and air currents generated by the paddles 152 of rotor assembly 148. Lip 154 increases the efficiency of both the vane assembly 122 and the rotor assembly 148.

In operation of cleaner 100, air is drawn into the chamber 114 through the vane assembly 122 in response to the low pressure created in stack 111 by operation of the internal combustion engine. The incoming air is entrained with particulate matter such as dust, sand, dirt, snow, and the like. As the air passes over the canted vanes 126, a circuitous motion is imparted to it and it circulates about the chamber 114. Centrifugal forces imparted to the air by the circular motion cause particulate matter to be forced to the outer extremities of the chamber 114 while the relatively clean air remains in the central portion thereof. The relatively clean air passes in a circular or vortex-type flow into the intake 119 of sleeve 118 impinging upon the blades 145, 146 of the disc 142 and causing it to rotate. Rotation of the disc 142 imparts rotary movement to rotor assembly 148, moving the paddles 152 along the side walls of the chamber 114. The paddles 152 impart additional circular motion to the air in chamber 114 and urge the particle entrained air outwardly of the discharge slot 129.

The domed top portion 117 of cleaner 100 adds strength to the cleaner 100 and allows a slightly larger discharge opening 129 for more efficient removal of dirt and like particles entrained in the air.

Referring to FIG. 5, there is shown generally at 160 a modified precleaner according to the present invention. Cleaner 160 has a substantially tubular housing, indicated at 161, defining a separation chamber 162. A rotor assembly 164 is located in the chamber 162 for movement of particulate entrained air outward therefrom. A sleeve 165 is attached to and extends downward from the top wall 166 of housing 161. A bolt 167 is threaded through the top wall 166 and into the upper end of sleeve 165 to secure it in place. Sleeve 165 has a reduced lower end 169 which accommodates a bearing 170. Bearing 170 is held in place by a nut 171 threaded to the lower extremity of the lower portion 169 of sleeve 165.

A plurality of arms 173 extend radially outward from the bearing 170. Located on the outer end of each arm 173 is a paddle 174 comprised as a forwardly curved, vertically orientated blade particularly adapted for the movement of particle entrained air.

Housing 162 has an annular, outwardly enlarged ridge 175 which defines an outwardly extended, circumferential channel in chamber 162. The paddles 174 are located in the channel 176 and thus are removed from the mainstream of air flow in chamber 162. Air movement caused by the paddles 174 does not interfere with the free flow of air though the chamber 162 entering an intake stack (not shown) leading to an internal combustion engine.

In use, air enters a vane assembly located at the bottom of the housing 161 (not shown) and, as previously described, has imparted to it a circular motion in the chamber 162. The air impinges upon the convex side of paddles 174, imparting a rotating motion to rotary assembly 164. The particle entrained air moves toward the outer portion of the chamber 162. The rotating paddles 174 force the particle entrained air out of the chamber 162 through the discharge opening 178 located on the ridge 175. The discharge opening 178 has a vertical dimension just slightly larger than the vertical dimension of the paddles 174. As the paddles move in the channel 176, they do not interfere with the flow of clean air through the chamber 162 into the intake stack.

While there has been shown and described a specific embodiment of the invention, it will be apparent to those skilled in the art that certain deviations may be had from that embodiment shown without departing from the scope and spirit of the appended claims.

The embodiments of the invention in which an exclusive property or privelege is claimed are defined as follows:

1. An apparatus mountable on a low pressure intake stack for separating particulates from particulate entrained gas for entry into the stack, comprising: a housing having a chamber, said housing including a generally tubular and vertical side wall surrounding the chamber, first end wall means attached to said side wall closing one end of said chamber, second end wall means attached to the side wall at the other end of said chamber, said second end wall means having a vane assembly having at least one inlet passage angularly positioned for directing the gas and particulates into the chamber in a circular direction whereby the particulates move outwardly by centrifugal force, and a tubular sleeve adapted to be mounted on a low pressure intake stack, said tubular sleeve located concentrically with said chamber and defining an outlet passage adapted to carry gas into said stack and extending substantially coaxially relative to the side wall into and open to the chamber for carrying gas separated from a substantial part of the particulates out of the chamber into the outlet passage, said outlet passage having an inlet opening located in the central portion of said chamber, said side wall having at least one elongate, vertical discharge opening spaning the vertical expanse of the side wall a length approximately equal to the vertical height of the chamber above the vane assembly, and spaced from the outlet passage providing a passageway for gas and particulates from the chamber, a rotor assembly located in said chamber to induce discharge of particulates from the chamber through the discharge opening, said rotor assembly including a plurality of arms extending from the center of said chamber radially outward toward said side wall, means rotatably mounting said arms on the housing for rotation in at least one direction about a vertical axis, a paddle secured to the outer end of each arm for movement with said arm adjacent the inside of said side wall, each of said paddles including an elongate, vertically oriented blade having a length generally corresponding to the length of the discharge opening, said discharge opening being tangentially directed relative to the side wall in the direction of rotation of said arms whereby said paddles are effective upon rotation of said arms to move gas and particulates through the discharge opening.

2. The apparatus of claim 1 wherein: each elongate blade has a forward surface, said surface having a transverse convex curvature to sweep entrained particulates from the chamber through the discharge opening upon rotation of the rotor assembly.

3. The apparatus of claim 1 wherein: said vane assembly includes a plurality of parallel, inclined, spaced apart vanes defining a plurality of inlet passages.

4. The apparatus of claim 1 wherein: said paddles have a length less than the length of the at least one discharge opening.

5. The apparatus of claim 1 including: propeller means located in said outlet passage and rotatable with the rotor assembly in response to gas flow through said outlet passage into said low pressure intake stack.

6. The apparatus of claim 5 wherein: the propeller means is a circular disc.

7. The apparatus of claim 1 wherein: the first wall means is a domed top wall, and said means rotatably mounting said arms on the housing indlude means mounted on said domed top wall.

8. The apparatus of claim 1 including: a removable adaptor collar having outside walls snugly in engagement with said sleeve and an inside dimension to be snugly mountable on said intake stack.

9. The apparatus of claim 1 wherein: the means mounting said arms on the housing includes a bearing assembly for rotatably connecting the rotor assembly to the first wall means for rotation about an axis generally aligned with the longitudinal axis of the outlet passage.

10. An apparatus mountable on a low pressure intake stack for separating particulates from particulate entrained gas for entry into the intake stack, comprising: a housing having a chamber, said housing including a generally tubular side wall surrounding the chamber, first end wall means attached to said side wall closing one end of said chamber, second end wall means attached to the side wall at the other end of said chamber, said second end wall means having a vane assembly having at least one inlet passage angularly positioned for directing the gas and particulates into the chamber in a circular direction whereby the particulates move outwardly by centrifugal force, and a tubular sleeve mountable on a low pressure intake stack, said tubular sleeve located concentrically with said chamber and defining an outlet passage adapted to carry gas into said stack and extending substantially coaxially relative to the side wall into and open to the chamber for carrying gas separated from a substantial part of the particulates out of the chamber, said outlet passage having an inlet opening located in the central portion of said chamber, said side wall having at least one elongate, vertical discharge opening spaced from the outlet passage providing a passageway for gas and particulates from the chamber, a rotor assembly located in said chamber to induce discharge of particulates from the chamber through the discharge opening, said rotor assembly including a plurality of arms extending from the center of said chamber radially outward toward said side wall, means rotatably mounting said arms on the housing a paddle secured to the outer end of each arm for movement with said arm adjacent said side walls, said side wall having an outwardly extended, annular ridge defining a circumferential channel in said chamber, said paddles being located in said channel, said discharge opening being located in said ridge.

11. An apparatus mountable on a low pressure intake stack for separating particulates from particulate entrained gas for entry into the intake stack, comprising: a housing having a chamber, said housing including a generally tubular side wall surrounding the chamber, first end wall means attached to said side wall closing one end of said chamber, second end wall means attached to the side wall at the other end of said chamber, said second end wall means having a vane assembly having at least one inlet passage angularly positioned for directing the gas and particulates into the chamber in a circular direction whereby the particulates move outwardly by centrifugal force, and a tubular sleeve mountable on a low pressure intake stack, said tubular sleeve located concentrically with said side wall and defining an outlet passage for carrying gas into said stack and extending substantially coaxially into and open to the chamber for carrying gas separated from a substantial part of the particulates out of the chamber into the outlet passage, said outlet passage having an inlet opening located in the central portion of said chamber, said side wall having at least one elongate, vertical discharge opening spaced from the outlet passage providing a passageway for gas and particulates from the chamber, an inner peripheral lip located in the lower portion of the chamber in position to block interference between gas flow passing through the inlet passage and gas flow through the at least one discharge opening, a rotor assembly located in said chamber to induce discharge of particulates from the chamber through the at least one discharge opening, said rotor assembly including a plurality of arms extending from the center of said chamber radially outward toward said side wall, means rotatably mounting said arms on the housing, a paddle secured to the outer end of each arm for rotational movement adjacent said side wall.

12. An apparatus mountable on a low pressure intake stack for separating particulates from particulate entrained gas for entry into the intake stack, comprising: a generally tubular housing having a side wall surrounding a chamber, wall means attached to said side wall closing one end of said chamber, an inlet passage open to the other end of said chamber adjacent the side wall, a vane assembly associated with the inlet passage angularly positioned for directing the gas and particulates into the chamber in a circular direction whereby the particulates moves outwardly by centrifugal force, a tubular sleeve mountable on a low pressure intake stack, said tubular sleeve located concentrically with said side wall and defining an outlet passage for carrying gas into said stack and extending substantially coaxially into and open to the chamber for carrying gas separated from a substantial part of the particulates out of the chamber into the outlet passage, said outlet passage having an inlet opening located in the central portion of said chamber, an elongate, vertical discharge opening spaced from the outlet passage in said side wall providing a passageway for gas and particulates from the chamber, a rotor assembly to induce discharge of particulates from the chamber through the discharge opening, said rotor assembly including a plurality of arms extending from the center of said chamber radially outward toward said side wall, means rotatably mounting said arms, a paddle secured to the outer end of each arm for movement with said arm adjacent said side wall, each of said paddles comprising an elongate blade extended parallel to said discharge opening and having a forward surface transversely convex curved to sweep entrained particulates from the chamber through the discharge opening upon rotation of the rotor assembly, said rotor assembly also including propeller means located in said outlet passage and rotatable with the rotor assembly responsive to gas flow through said outlet passage into said low pressure intake stack, said propeller means including a flat, circular disc disposed in a plane generally parallel to the axis of said outlet passage and mounted for rotation about a diameter of the disc upon rotation of said arms.

13. The apparatus of claim 12 wherein: said vane assembly includes a plurality of parallel, inclined, spaced apart vanes defining a plurality of inlet passages.

14. The apparatus of claim 12 wherein: said paddles have a length less than the length of the discharge opening.

15. The apparatus of claim 12 wherein: the first wall means is a domed top wall, and said means rotatably mounting said arms including means mounted on said domed top wall.

16. The apparatus of claim 12 including: a removable adaptor collar having outside walls snugly in engagement with said sleeve and an inside dimension to be snugly mountable on said intake stack.

17. The apparatus of claim 12 wherein: the means mounting said arms on the housing includes a bearing assembly for rotatably connecting the rotor assembly to the first wall means for rotation about an axis generally aligned with the longitudinal axis of the outlet passage.

18. An apparatus mountable on a low pressure intake stack for separating particulates from particulate entrained gas for entry into the intake stack, comprising: a generally tubular housing having a side wall surrounding a chamber, wall means attached to said side wall closing one end of said chamber, an inlet passage open to the other end of said chamber adjacent the side wall, a vane assembly associated with the inlet passage positioned for directing the gas and particulates into the chamber in a circular direction whereby the particulates move outwardly by centrifugal force, a tubular sleeve mountable on a low pressure intake stack located concentrically with said side wall and defining an outlet passage for carrying gas into said stack and extending substantially coaxially into and open to the chamber for carrying gas separated from a substantial part of the particulates out of the chamber into the outlet passage, said outlet passage having an inlet opening located in the central portion of said chamber, an elongate, vertical discharge opening spaced from the outlet passage in said side wall providing a passageway for gas and particulates from the chamber, a rotor assembly to induce discharge of particulates from the chamber through the discharge opening, said rotor assembly including a plurality of arms extending from the center of said chamber radially outward toward said side wall, means rotatably mounting said arms, a paddle secured to the end of each arm for movement with said arm adjacent said side wall, each of said paddles comprising an elongate blade parallel to said discharge opening, each of said blades having a forward surface, said surface having a transverse convex curvature to sweep entrained particulates from the chamber through the discharge opening upon rotation of the rotor assembly, said side wall having an outwardly extended, annular ridge defining a circumferential channel in said chamber, said paddles being located in said channel, said discharge opening being located on said ridge.

19. The apparatus of claim 18 including: propeller means located in said outlet passage and rotatable with the rotor assembly in response to gas flow through said outlet passage into said low pressure intake stack.

20. The apparatus of claim 19 wherein: the propeller means is a circular disc.

21. An apparatus mountable on a low pressure intake stack for separating particulates from particulate entrained gas for entry into the intake stack, comprising: a generally tubular housing having a side wall surrounding a chamber, wall means attached to said side wall closing one end of said chamber, an inlet passage open to the other end of said chamber adjacent the side wall, a vane assembly associated with the inlet passage positioned for directing the gas and particulates into the chamber in a circular direction whereby the particulates move outwardly by centrifugal force, a tubular sleeve mountable on a low pressure intake stack located concentrically with said side wall and defining an outlet passage for carrying gas into said stack and extended substantially coaxially into and open to the chamber for carrying gas separated from a substantial part of the particulates out of the chamber to the outlet passage, said outlet passage having an inlet opening located in the central portion of said chamber, an elongate, vertical discharge opening spaced from the outlet passage in said side wall providing a passageway for gas and particulates from the chamber, a rotor assembly to induce discharge of particulates from the chamber through the discharge opening, said rotor assembly including a plurality of arms extending from the center of said chamber radially outward toward said side wall, means rotatably mounting said arms, a paddle secured to the outer end of each arm for rotational movement adjacent said side wall, each of said paddles comprising an elongate blade located parallel to said discharge opening, each blade having a forward curved surface, said surface having a transverse convex curvature to sweep entrained particulates from the chamber through the discharge opening upon rotation of the rotor assembly, and an inner peripheral lip located in the lower portion of the chamber in position to block interference between gas flow passing through the inlet passage and gas flow through the discharge opening.

* * * * *